United States Patent
Tokgoz et al.

(10) Patent No.: US 11,477,826 B2
(45) Date of Patent: Oct. 18, 2022

(54) HIGH BAND ACCESS

(71) Applicant: QUALCOMM Incorporated, San Diego, CA (US)

(72) Inventors: Yeliz Tokgoz, San Diego, CA (US);
Heechoon Lee, San Diego, CA (US);
Tingfang Ji, San Diego, CA (US);
Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/510,692

(22) Filed: Jul. 12, 2019

(65) Prior Publication Data
US 2020/0022189 A1    Jan. 16, 2020

Related U.S. Application Data

(60) Provisional application No. 62/698,474, filed on Jul. 16, 2018.

(51) Int. Cl.
| | | |
|---|---|---|
| *H04W 74/08* | (2009.01) | |
| *H04W 72/08* | (2009.01) | |
| *H04W 76/10* | (2018.01) | |
| *H04L 5/14* | (2006.01) | |
| *H04W 68/02* | (2009.01) | |

(52) U.S. Cl.
CPC ......... *H04W 74/0833* (2013.01); *H04L 5/14* (2013.01); *H04W 72/085* (2013.01); *H04W 76/10* (2018.02); *H04W 68/02* (2013.01)

(58) Field of Classification Search
None
See application file for complete search history.

(56) References Cited

U.S. PATENT DOCUMENTS

| | | | |
|---|---|---|---|
| 2009/0191874 A1* | 7/2009 | Du | H04W 36/18 455/436 |
| 2012/0170532 A1* | 7/2012 | Kato | H04W 36/0072 370/329 |
| 2014/0092785 A1 | 4/2014 | Song et al. | |
| 2016/0174124 A1* | 6/2016 | Basu Mallick | H04W 74/006 370/331 |

(Continued)

FOREIGN PATENT DOCUMENTS

WO    2013119018 A1    8/2013

OTHER PUBLICATIONS

International Search Report and Written Opinion—PCT/US2019/041841—ISA/EPO—dated Oct. 14, 2019.

*Primary Examiner* — Scott M Sciacca
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive system information for a first cell on a second cell, wherein the UE is camped on the second cell, and wherein the system information for the first cell is received with system information for the second cell; access an uplink of the first cell using the system information for the first cell; and establish a connection on the first cell as a serving cell. Numerous other aspects are provided.

30 Claims, 11 Drawing Sheets

(56) References Cited

U.S. PATENT DOCUMENTS

| | | | |
|---|---|---|---|
| 2016/0192376 A1* | 6/2016 | Lee | H04W 72/0406 370/252 |
| 2018/0249461 A1* | 8/2018 | Miao | H04W 24/10 |
| 2019/0150107 A1* | 5/2019 | Tang | H04W 16/02 370/329 |
| 2020/0045602 A1* | 2/2020 | Jiang | H04W 36/0079 |
| 2020/0068500 A1* | 2/2020 | Liu | H04W 52/24 |
| 2020/0068509 A1* | 2/2020 | Ahn | H04W 52/44 |
| 2021/0153253 A1* | 5/2021 | Wang | H04W 74/0833 |

* cited by examiner

HIGH BAND ACCESS

CROSS-REFERENCE TO RELATED APPLICATIONS UNDER 35 U.S.C. § 119

This application claims priority to Provisional Patent Application No. 62/698,474, filed on Jul. 16, 2018, entitled "TECHNIQUES AND APPARATUSES FOR HIGH BAND ACCESS," which is hereby expressly incorporated by reference herein.

FIELD OF THE DISCLOSURE

Aspects of the present disclosure generally relate to wireless communication, and more particularly to techniques and apparatuses for high band access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving system information for a first cell on a second cell, wherein the UE is camped on the second cell, and wherein the system information for the first cell is received with system information for the second cell; accessing an uplink of the first cell using the system information for the first cell; and establishing a connection on the first cell as a serving cell.

In some aspects, a UE for wireless communication may include memory and one or more processors operatively coupled to the memory. The memory and the one or more processors may be configured to receive system information for a first cell on a second cell, wherein the UE is camped on the second cell, and wherein the system information for the first cell is received with system information for the second cell; access an uplink of the first cell using the system information for the first cell; and establish a connection on the first cell as a serving cell.

In some aspects, a non-transitory computer-readable medium may store one or more instructions for wireless communication. The one or more instructions, when executed by one or more processors of a UE, may cause the one or more processors to receive system information for a first cell on a second cell, wherein the UE is camped on the second cell, and wherein the system information for the first cell is received with system information for the second cell; access an uplink of the first cell using the system information for the first cell; and establish a connection on the first cell as a serving cell.

In some aspects, an apparatus for wireless communication may include means for receiving system information for a first cell on a second cell, wherein the apparatus is camped on the second cell, and wherein the system information for the first cell is received with system information for the second cell; means for accessing an uplink of the first cell using the system information for the first cell; and means for establishing a connection on the first cell as a serving cell.

In some aspects, a method of wireless communication, performed by a UE, may include receiving system information for a first cell on a second cell, wherein the UE is camped on the second cell, and wherein the first cell is a lower cell than the second cell; and selectively accessing an uplink of the first cell, or an uplink of the second cell, based at least in part on a measurement of the first cell.

In some aspects, a UE for wireless communication may include memory and one or more processors operatively coupled to the memory. The memory and the one or more processors may be configured to receive system information for a first cell on a second cell, wherein the UE is camped on the second cell, and wherein the first cell is a lower cell than the second cell; and selectively access an uplink of the first cell, or an uplink of the second cell, based at least in part on a measurement of the first cell.

In some aspects, a non-transitory computer-readable medium may store one or more instructions for wireless communication. The one or more instructions, when executed by one or more processors of a UE, may cause the one or more processors to receive system information for a first cell on a second cell, wherein the UE is camped on the second cell, and wherein the first cell is a lower cell than the second cell; and selectively access an uplink of the first cell, or an uplink of the second cell, based at least in part on a measurement of the first cell.

In some aspects, an apparatus for wireless communication may include means for receiving system information for a first cell on a second cell, wherein the apparatus is camped on the second cell, and wherein the first cell is a lower cell than the second cell; and means for selectively accessing an uplink of the first cell, or an uplink of the second cell, based at least in part on a measurement of the first cell.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
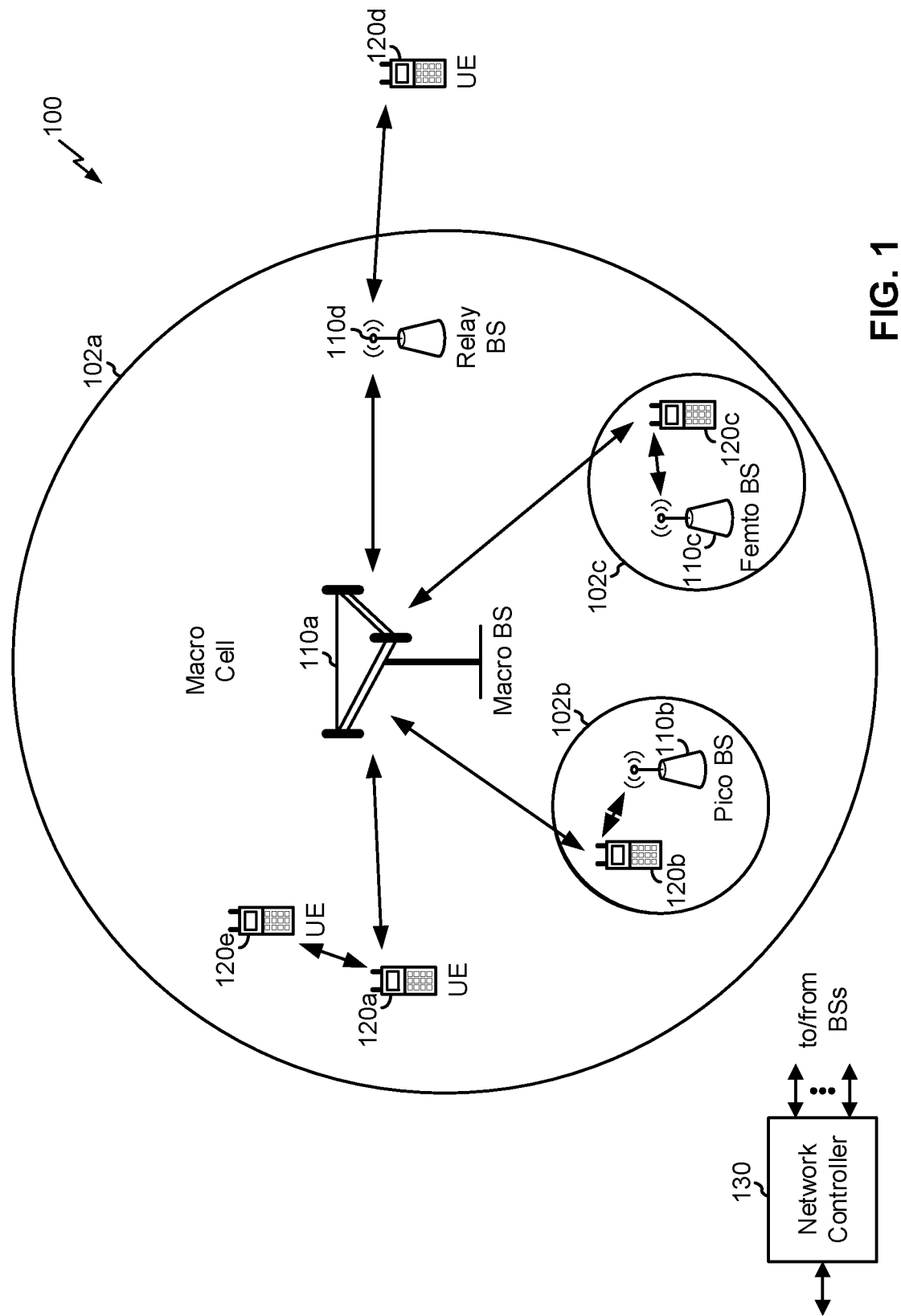
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein. A cell may be provided on a band, and may be associated with a frequency on the band.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
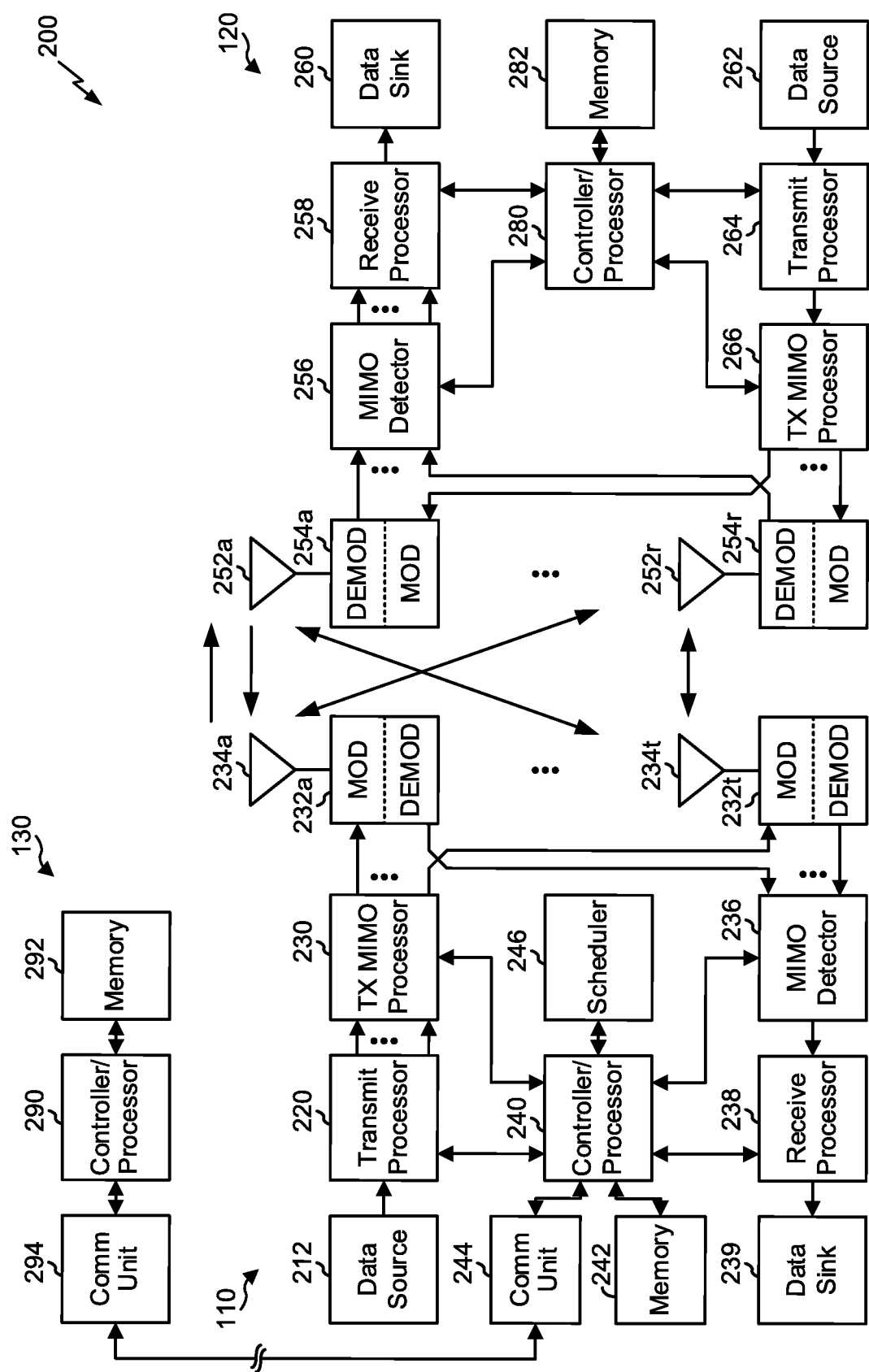
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with high band access for 5G/NR, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving system information for a first cell on a second cell, wherein the UE is camped on the second cell, and wherein the system information for the first cell is received with system information for the second cell; means for accessing an uplink of the first cell using the system information for the first cell; means for establishing a connection on the first cell as a primary cell; means for performing a random access procedure for the first cell using the system information; means for performing a periodic search or measurement of the first cell while the UE is in an idle mode or an inactive mode; means for acquiring a downlink of the first cell; means for initiating a random access procedure on the first cell, wherein downlink and uplink messages associated with the random access procedure are transmitted and received on the first cell; means for acquiring the downlink of the first cell using a first receive chain, wherein a second receive chain is used for communication using the second cell; means for receiving system information for a first cell on a second cell, wherein the UE is camped on the second cell, and wherein the first cell is a lower cell than the second cell; means for selectively accessing an uplink of the first cell, or an uplink of the second cell, based at least in part on a measurement of the first cell; means for configuring the first cell as a secondary cell of the UE based at least in part on a blind handover; and/or the like. In some aspects, such means may include one or more components of UE 120 described in connection with FIG. 2.

As indicated above, FIG. 2 is provided as an example. Other examples may differ from what was described with regard to FIG. 2.

Figure 3A:
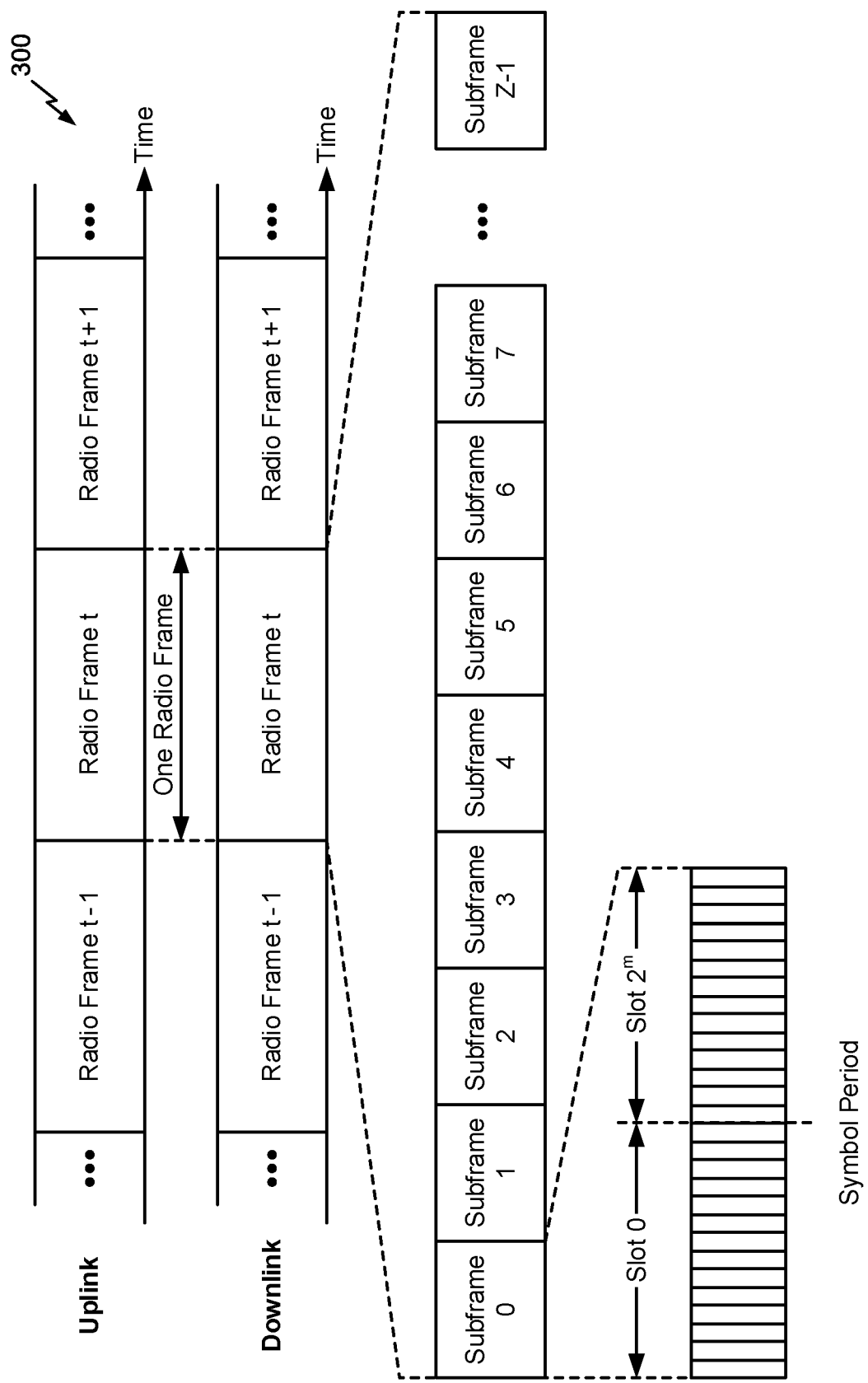
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
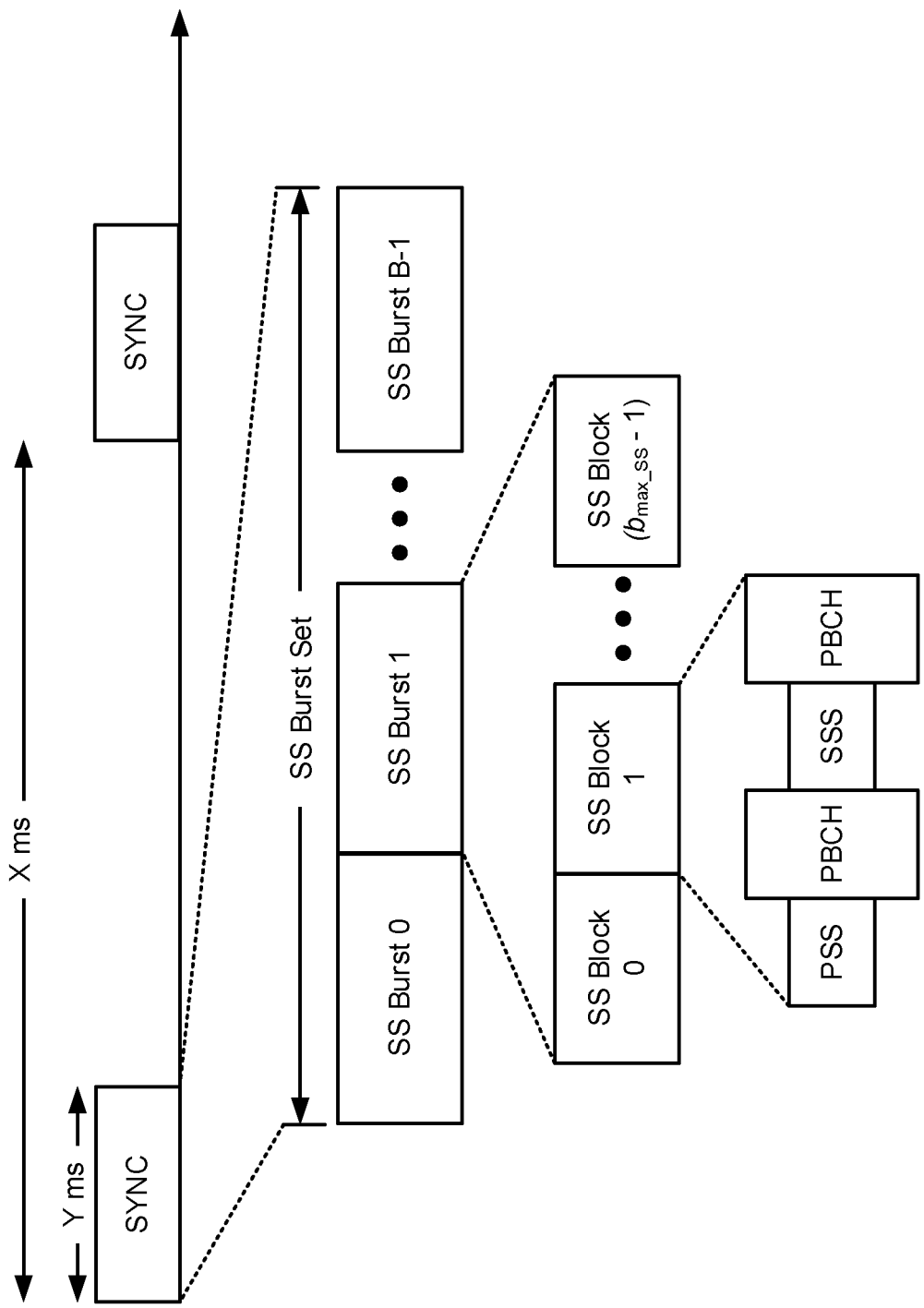
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
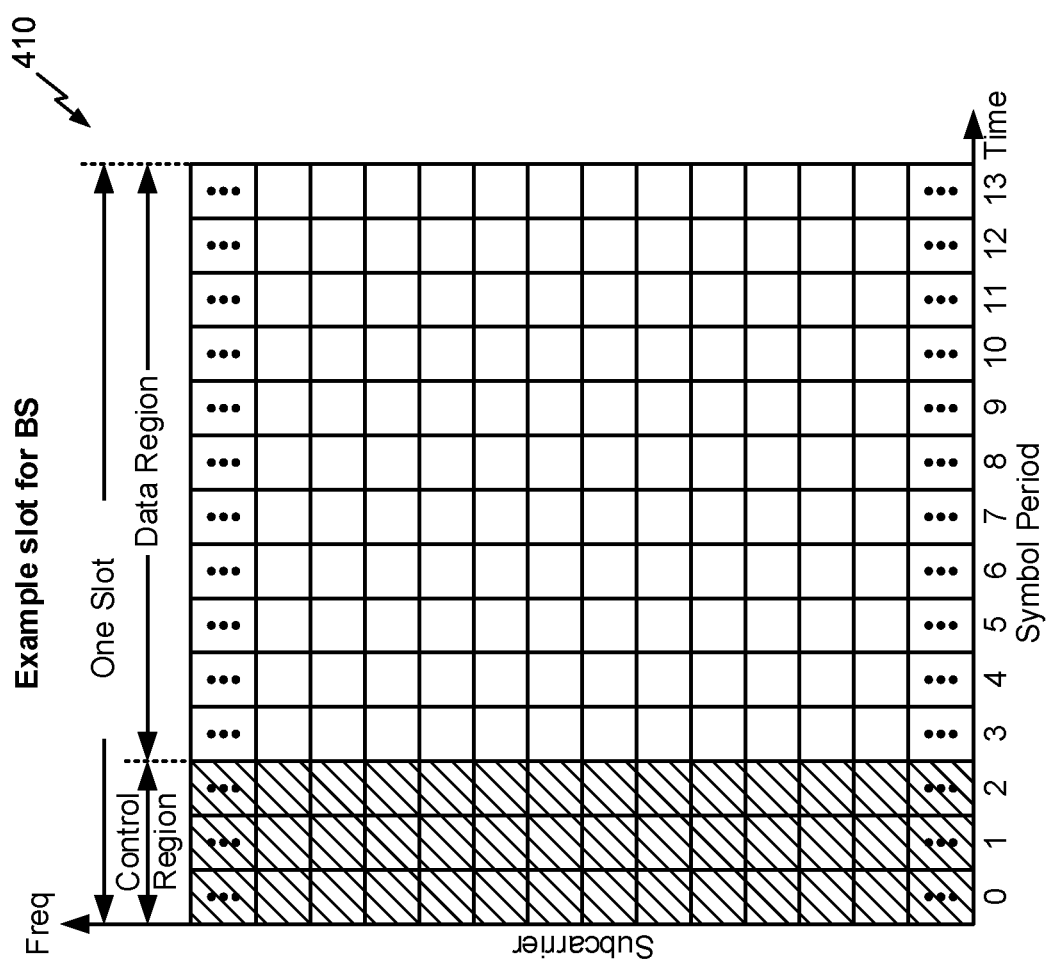
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2 Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. NR may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

There may be an imbalance in coverage between the uplink and the downlink. This imbalance may be particularly problematic in 5G/NR for reasons such as a power imbalance between the UE (e.g., UE 120) and the BS (e.g., BS 110), sub-optimal BS uplink implementations, and/or the like. Thus, uplink coverage holes may be present in locations where the downlink signal is still strong. For this reason, system selection and inter-radio-access-technology for 5G/NR may be configured conservatively to ensure that the UE is within 5G/NR uplink coverage. This may reduce or delay the use of 5G/NR bands.

One approach for handling high band (e.g., 5G/NR, uplink, etc.) coverage holes is using a supplementary uplink (SUL) with a low band and a high band. In SUL, the UE may camp on a high band based at least in part on a downlink signal. A broadcast downlink signal may advertise random access channel (RACH) configuration information for a high band uplink and for a low band uplink. When the UE determines that a RACH procedure is to be performed (e.g., based at least in part on receiving paging and/or the like), the UE may select an uplink (e.g., of the high band uplink and the low band uplink) for the RACH procedure based at least in part on a measurement on the high band. The UE may then begin to determine system information associated with the selected uplink, and may acquire the selected uplink using the system information.

Another approach for handling high band coverage holes is carrier aggregation (CA) using a low band and a high band. In CA, the UE may camp on the low band based at least in part on a downlink signal of the low band. When the UE is to perform the RACH procedure, the UE may use the camped low band carrier for the RACH procedure. After the RACH procedure, a high band component carrier may be added and activated (e.g., by providing configuration information on the low band).

In both SUL and CA, there may be significant delay while the UE determines system information, performs the RACH procedure, and acquires the high band. This may mean that the usage of the large bandwidth associated with the high band is delayed. Thus, the high band may not be usable for some types of traffic (e.g., small traffic, bursty traffic, etc.), which impacts user experience and reduces bandwidth of the UE.

Some techniques and apparatuses described herein may provide system information for acquisition and accessing of a low band and a high band via one of the low band or the high band. In some cases, the UE may camp on a low band, which improves coverage and reduces the number of reselections. The UE may use the system information to acquire and access the high band more quickly than if the UE were to obtain the system information after determining that the high band is to be acquired or accessed. In other cases, the UE may camp on the high band, and may acquire or access the low band using the system information. Thus, the UE may save time associated with acquiring and accessing a high band or a low band, which improves bandwidth of the UE, reduces delay associated with communicating on the high band, and improves user experience.

It should be noted that "band" is used herein to refer to a cell associated with a frequency included in a band. In other words, a UE referred to as camping on a band should be understood to be camping on a cell associated with a frequency included in the band. Similarly, a UE referred to as communicating on a band should be understood to be communicating on a cell associated with a frequency included in the band.

Figure 5:
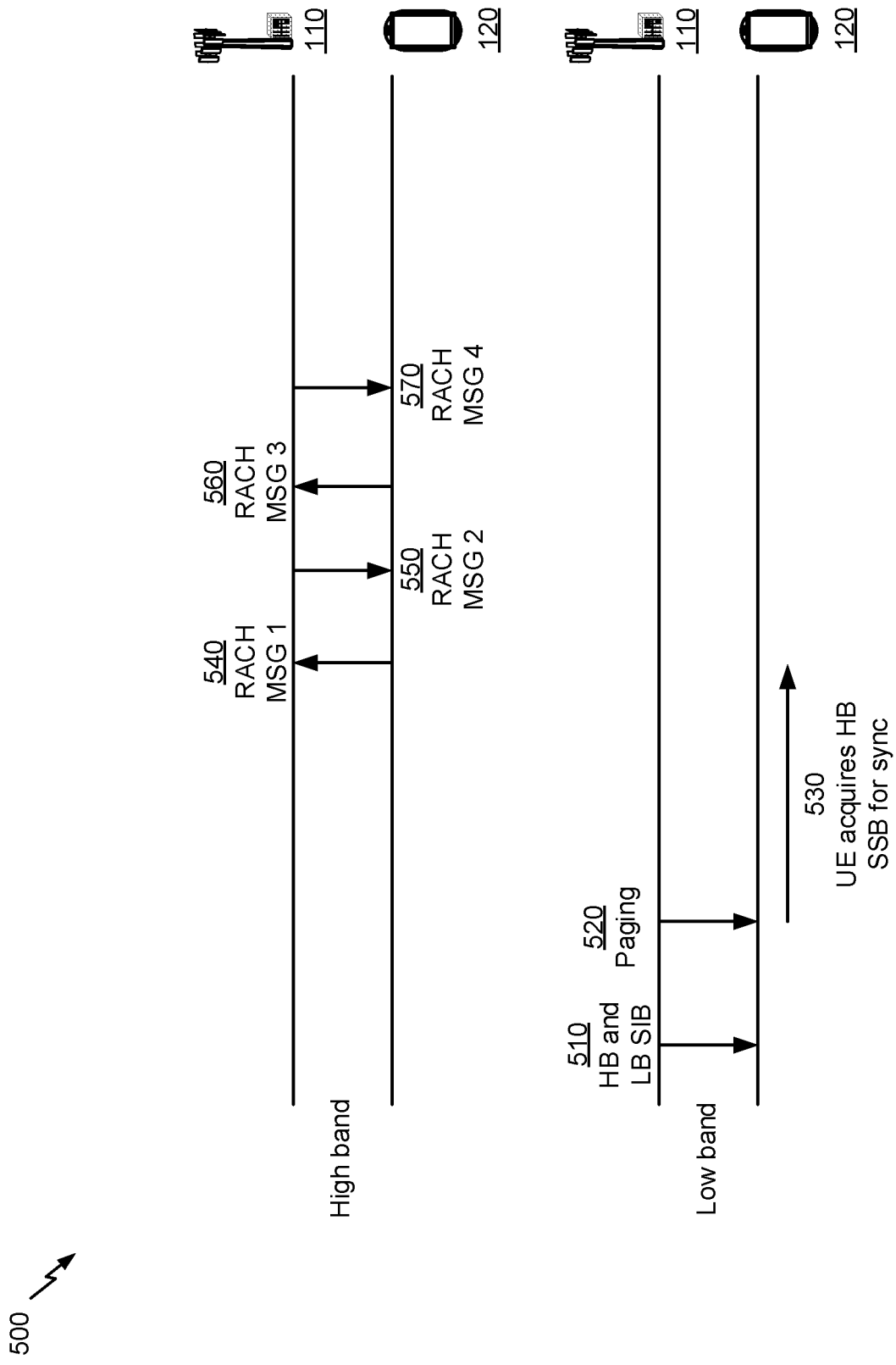
FIG. 5 is a diagram illustrating an example of high band access for 5G/NR, in accordance with various aspects of the present disclosure.

FIG. 5 is a diagram illustrating an example 500 of high band access for 5G/NR, in accordance with various aspects of the present disclosure. FIG. 5 shows a UE 120 and a BS 110, and a call flow between the UE 120 and the BS 110 is illustrated for a high band (in the top half of FIG. 5) and for a low band (in the bottom half of FIG. 5). For the purpose of FIG. 5, assume that a UE 120 is camped on a low band, which may provide better coverage and fewer reselections than camping on a high band. Furthermore, by camping on the low band, the UE 120 may avoid multi-beam paging in the case when the high band is operated in a multi-beam mode. As used herein, a high band may refer to a 5G/NR band, a super-6 GHz band, a mm Wave band, a Frequency Range (FR) 2 band, an FR3 band, an FR4 band, and/or the like. As used herein, a low band may refer to a 4G/LTE band, a sub-6 GHz band, an FR1 band, and/or the like. In some aspects, a high band may refer to a band that is associated with a higher frequency (e.g., center frequency) than a low band. In some aspects, the high band may have a larger bandwidth than the low band.

As shown in FIG. 5, and by reference number 510, the UE 120 may receive system information (e.g., a system information block (SIB)) on the low band from the BS 110. For example, the system information may be for the low band and for the high band. In some aspects, the system information may be broadcasted, such as in a physical broadcast channel. In some aspects, the system information may include a subset of all system information for the high band. For example, the subset may include information used for transitioning from an idle mode or an inactive mode to a connected mode with regard to the high band (e.g., a master information block, a SIB0, a frequency location of the high band, security information for the high band, RACH information for the high band, information for acquiring a downlink of the high band, etc.). Thus, the UE 120 and the BS 110 conserve bandwidth that would otherwise be used to provide all system information of the high band using the low band.

As shown by reference number 520, the UE 120 may receive paging on the low band. For example, the UE 120 may determine that uplink data is to be provided on the high band based at least in part on receiving the paging on the low band. In some aspects, the UE 120 may determine that mobile-originated data is to be provided by the UE 120 on the high band.

As shown by reference number 530, the UE 120 may acquire a high band synchronization signal block for synchronization, which may be referred to herein as acquiring a downlink of the high band. For example, the UE 120 may acquire the high band synchronization signal block based at least in part on the system information received on the low band. In some aspects, the UE 120 may immediately acquire the high band downlink (e.g., without obtaining system information after the UE 120 receives paging or determines that mobile-originated data is to be transmitted on the high band). In this way, the UE 120 conserves time and bandwidth resources that would otherwise be used to obtain system information for the high band after the paging is received or the UE 120 determines that the mobile-originated data is to be provided.

In some aspects, the UE 120 may perform a search or measurement for the high band. For example, the UE 120 may periodically perform the search or measurement based at least in part on the system information (e.g., based at least in part on information identifying the high band in the system information), which may further reduce delay associated with transitioning to connected mode on the high band. For example, performing the search or measurement periodically may allow the UE 120 to use a previously-performed search or measurement rather than performing a new search or measurement after the paging to acquire the downlink of the high band, which saves time associated with performing the search or measurement on-demand.

As shown by reference numbers 540, 550, 560, and 570, the UE 120 and the BS 110 may perform the RACH procedure on the high band, which may be referred to herein as accessing the high band. For example, the UE 120 and the BS 110 may exchange RACH messages 1, 2, 3, and 4 on the high band. In some aspects, the UE 120 may enter connected mode with regard to the high band based at least in part on the procedure. In some aspects, the high band may be set as a primary cell (PCell) of the UE 120. For example, the UE 120 may receive signaling indicating that the high band is to be set or used as the primary cell of the UE 120, and/or may determine that the high band is to be set as the primary cell. Thus, the UE 120 may have quicker access to bandwidth of the high band than if system information is obtained after paging is received.

As indicated above, FIG. 5 is provided as an example. Other examples may differ from what is described with respect to FIG. 5.

Figure 6:
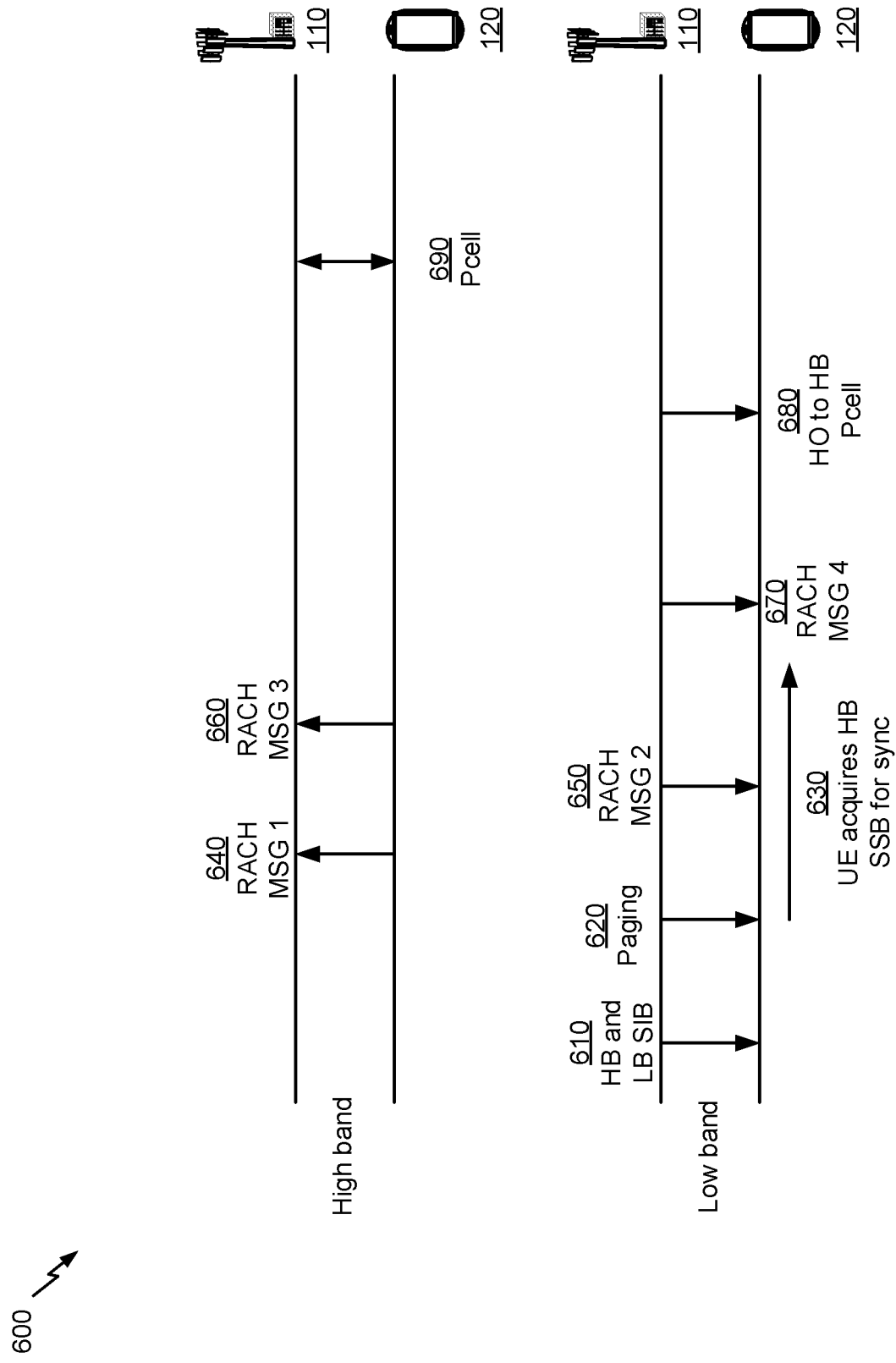
FIG. 6 is a diagram illustrating another example of high band access for 5G/NR, in accordance with various aspects of the present disclosure.

FIG. 6 is a diagram illustrating an example 600 of high band access for 5G/NR, in accordance with various aspects of the present disclosure. FIG. 6 shows a UE 120 and a BS 110, and a call flow between the UE 120 and the BS 110 is illustrated for a high band (in the top half of FIG. 6) and for a low band (in the bottom half of FIG. 6). For the purpose of FIG. 6, assume that the UE 120 is camped on the low band.

As shown in FIG. 6, and by reference number 610, the UE 120 may receive system information (e.g., a SIB) on the low band from the BS 110, which is described in more detail in connection with block 510 of FIG. 5, above. As shown by reference number 620, the UE 120 may receive paging on the low band. For example, the UE 120 may determine that uplink data is to be provided on the high band based at least in part on receiving the paging on the low band. In some aspects, the UE 120 may determine that mobile-originated data is to be provided by the UE 120 on the high band. As shown by reference number 630, the UE 120 may acquire the synchronization signal block of the high band for synchronization (e.g., may acquire the downlink of the high band), which is described in more detail in connection with block 530 of FIG. 5, above.

As shown by reference numbers 640, 650, 660, and 670, the UE 120 may perform part of the RACH procedure using the low band and part of the RACH procedure using the high band in order to access the high band. For example, the UE 120 may perform the RACH procedure while the UE 120 acquires the synchronization signal block (e.g., the downlink) of the high band. This may be possible because the UE 120 may not need to synchronize with the high band to transmit RACH message 1 (shown by reference number 640) and RACH message 3 (shown by reference number 660) on the high band.

In some aspects, the UE 120 may determine that one or more RACH messages are to be provided on the high band. For example, the UE 120 may determine whether a downlink measurement (e.g., reference signal received power or another measurement) of the low band satisfies the threshold. When the downlink measurement of the low band satisfies the threshold, the UE 120 may determine that coverage of the high band may be sufficient for providing the one or more messages on the high band. In this way, the UE 120 may selectively provide the RACH messages on the low band or on the high band based at least in part on a measurement on the low band.

In some aspects, the UE 120 may communicate on the low band using a first receive chain, and may acquire the downlink of the high band using a second receive chain (e.g., a receive chain different than the first receive chain). This may conserve resources of the first receive chain and may reduce time associated with retuning the first receive chain. In some aspects, the UE 120 may perform a search or measurement for the high band (e.g., periodically), as described in connection with FIG. 5, above.

As shown by reference number 680, the BS 110 may provide a handover message to the UE 120 on the low band. For example, the handover message may indicate that the UE 120 is to perform a handover, such as a blind handover, so that the high band is used as the primary cell. As shown by reference number 690, the UE 120 may use the high band as the primary cell based at least in part on the handover message. For example, the UE 120 and the BS 110 may perform the handover to use the high band as the primary cell.

As indicated above, FIG. 6 is provided as an example. Other examples may differ from what is described with respect to FIG. 6.

Figure 7:
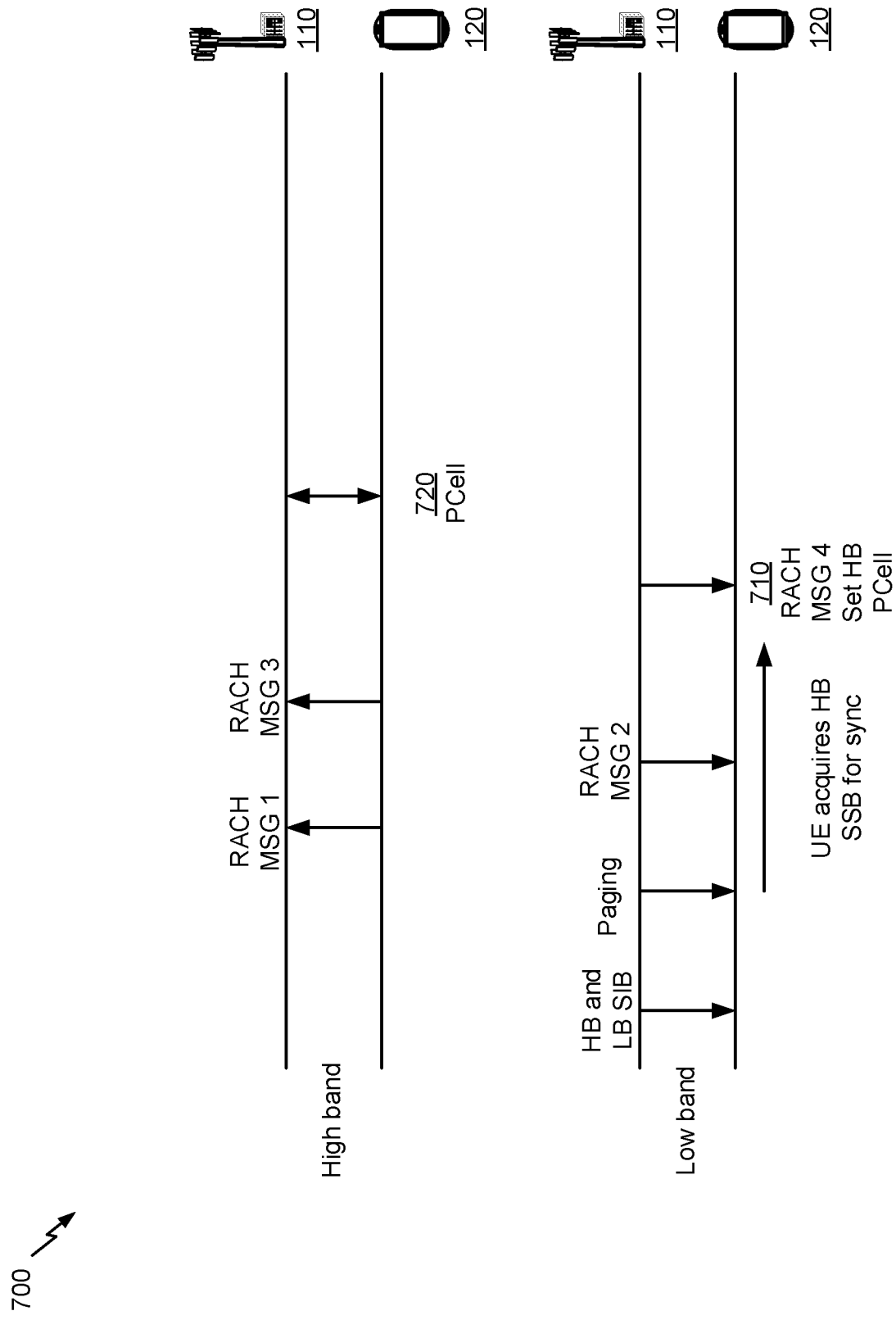
FIG. 7 is a diagram illustrating yet another example of high band access for 5G/NR, in accordance with various aspects of the present disclosure.

FIG. 7 is a diagram illustrating an example 700 of high band access for 5G/NR, in accordance with various aspects of the present disclosure. Some operations of FIG. 7 (e.g., signaling of the system information for both bands on the low band, paging/mobile-originated data determination, acquiring/synchronizing the downlink, performance of the RACH procedure during acquisition, etc.) are similar to the corresponding operations described in connection with FIGS. 5 and 6, and are not described any further. It should be understood that the operations described in connection with examples 500 and 600 can be performed similarly for example 700.

As shown in FIG. 7, and by reference number 710, in some aspects, the BS 110 may provide a handover message in a RACH message. For example, here, the BS 110 provides the handover message in RACH message 4. In some aspects, RACH message 4 may be modified from a standard format to include the handover message. In some aspects, RACH message 4 may be transmitted on particular resources, using a particular encoding scheme, using a particular cyclic prefix, and/or the like, to indicate the handover message. In some aspects, RACH message 4 may implicitly indicate the handover message. In some aspects, the handover message may be a blind handover message. By providing the handover message using RACH message 4, the BS 110 reduces delay with configuring the high band as the primary cell (shown by reference number 720) and downlink data transfer using the high band.

As indicated above, FIG. 7 is provided as an example. Other examples may differ from what is described with respect to FIG. 7.

Figure 8:
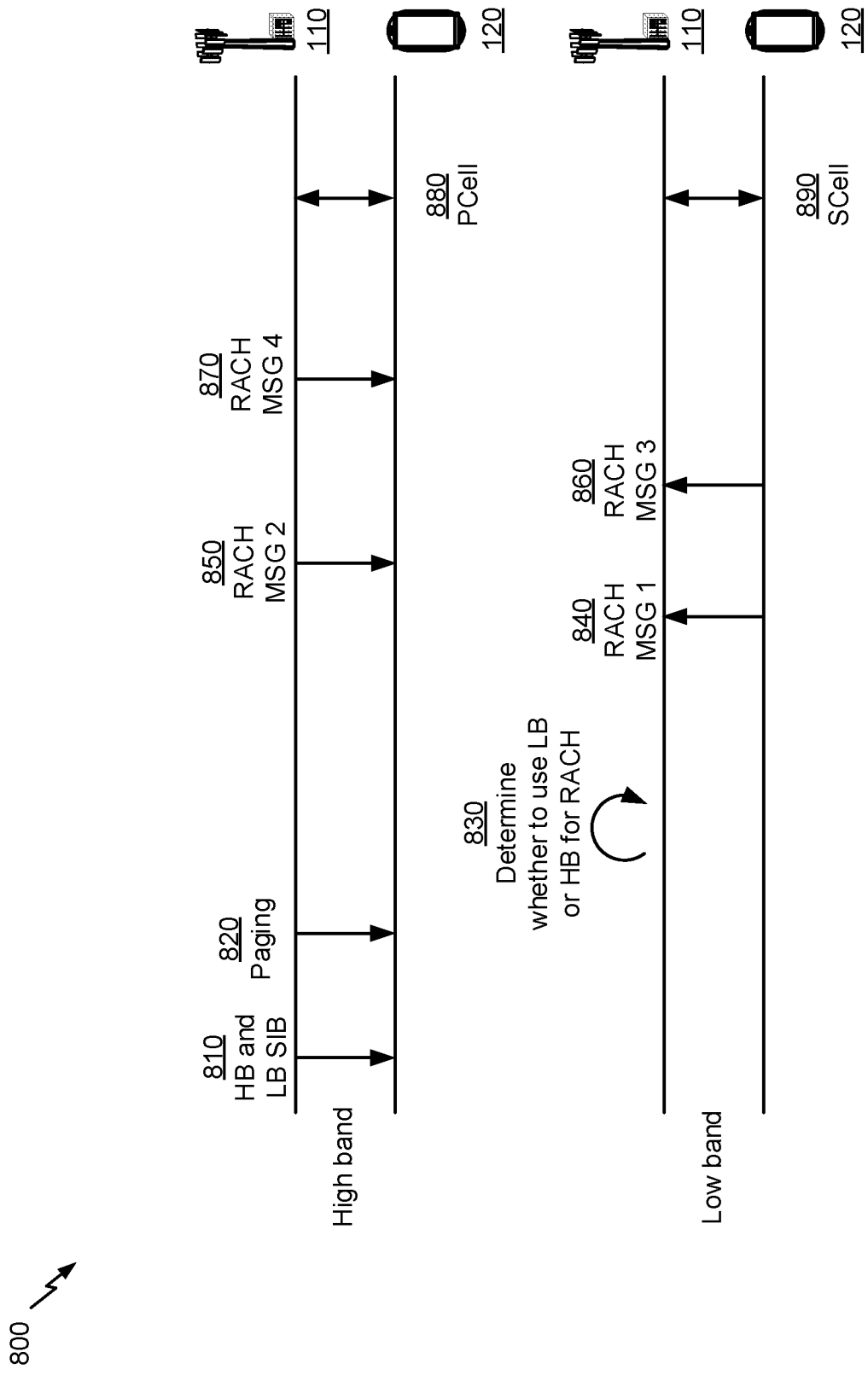
FIG. 8 is a diagram illustrating still another example of high band access for 5G/NR, in accordance with various aspects of the present disclosure.

FIG. 8 is a diagram illustrating an example 800 of high band access for 5G/NR, in accordance with various aspects of the present disclosure. FIG. 8 shows an example wherein a UE 120 camped on a high band communicates using the high band and a low band. In this case, the high band and the low band may be configured with frequency division duplexed carriers with an uplink and a downlink.

As shown by reference number 810, the UE 120 may receive system information for the high band and the low band from the BS 110. For example, the UE 120 may receive the system information on the high band since the UE 120 camped on the high band. As shown by reference number 820, the UE 120 may receive paging on the high band. For example, the UE 120 may determine that uplink data is to be provided based at least in part on receiving the paging on the high band. In some aspects, the UE 120 may determine that mobile-originated data is to be provided by the UE 120.

As shown by reference number 830, the UE 120 may determine whether to perform a RACH procedure for the low band or for the high band. For example, the UE 120 may determine whether to access an uplink on the low band or on the high band. In some aspects, the UE 120 may perform this determination based at least in part on a channel measurement (e.g., an RSRP, RSRQ, CQI, etc.) for the high band. For example, when the channel measurement does not satisfy a threshold (e.g., indicating poor coverage in the high band), the UE 120 may perform the RACH procedure for the low band, which improves reliability of the RACH procedure in low-coverage situations. When the channel measurement satisfies the threshold (e.g., indicating satisfactory coverage in the high band), the UE 120 may perform the RACH procedure for the high band, which increases bandwidth of the UE 120 and conserves low band resources.

As shown by reference numbers 840, 850, 860, and 870, the UE 120 and the BS 110 may perform the RACH procedure. For example, the UE 120 may access the selected band, of the low band and the high band. Here, the UE 120 provides RACH messages 1 and 3 (shown by reference numbers 840 and 860) using the low band. For example, the UE 120 may have determined, in connection with reference number 830, that a channel measurement for the high band does not satisfy a threshold. As further shown, the BS 110 provides RACH messages 2 and 4 (shown by reference numbers 850 and 870) using the high band. This may be because the BS 110 has sufficient transmit power to provide ample coverage in the downlink on the high band, while UE transmissions in the high band may not be sufficiently powerful for reliable random access.

As shown by reference number 880, the UE 120 may use the high band as a primary cell (PCell) and, as shown by reference number 890, the UE 120 may use the low band as a secondary cell (SCell). For example, the BS 110 may configure the UE 120 to use the high band as the primary cell (e.g., based at least in part on a handover command, such as a blind handover command). In some aspects, the BS 110 may configure the UE 120 to use the high band as the secondary cell (e.g., based at least in part on a handover command, such as a blind handover command). In some aspects, the UE 120 may use the low band as an FDD serving cell or a TDD serving cell. In this way, the UE 120 may camp on and use the high band as the primary cell for downlink purposes when coverage is poor, and may use the low band for a secondary cell and/or for uplink purposes.

As indicated above, FIG. 8 is provided as an example. Other examples may differ from what is described with respect to FIG. 8.

In some aspects, an operation described with regard to example 500, 600, 700, or 800 may be performed in any one or more of example 500, 600, 700, 800. For example, an operation described in connection with example 500 may be performed in any one or more of example 600, 700, or 800, and so on. Thus, any combination of the operations performed in connection with examples 500, 600, 700, and 800 are contemplated herein.

Figure 9:
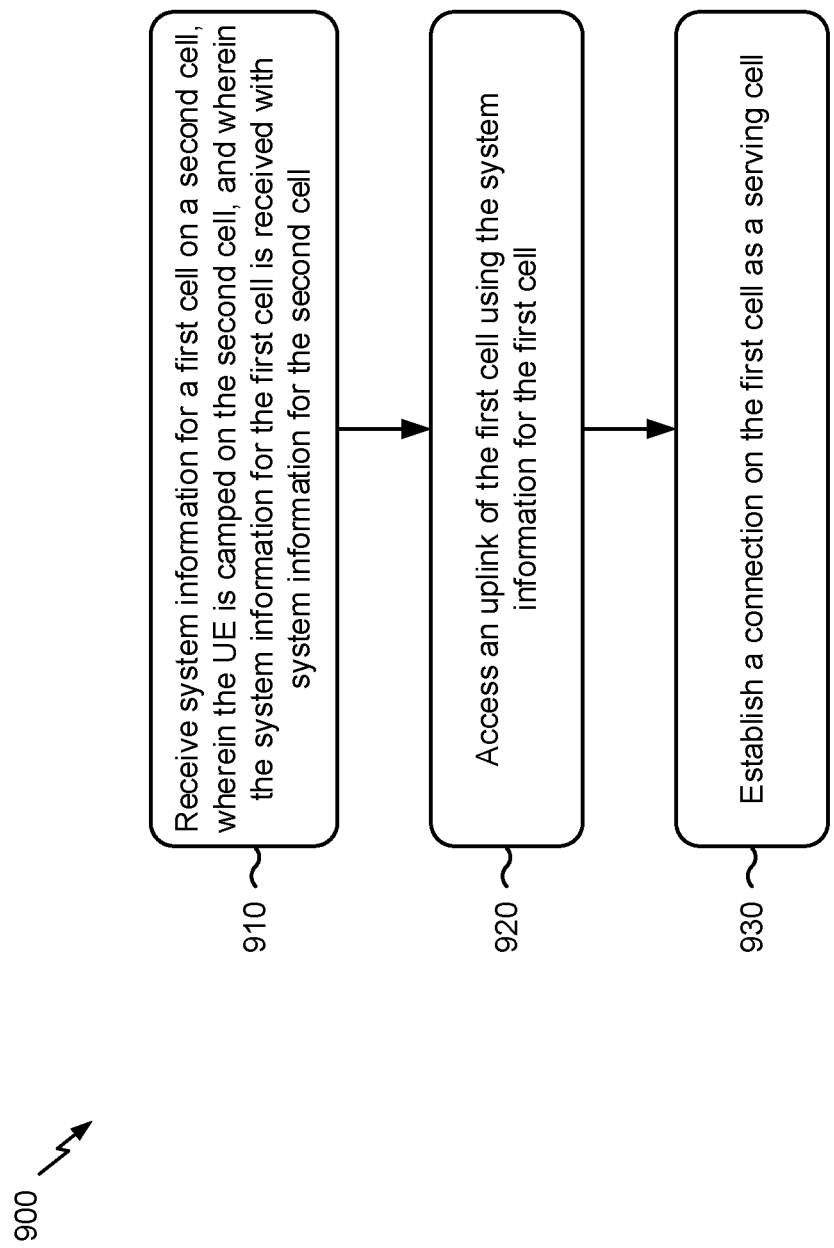
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs high cell access for 5G/NR. In some aspects, process 900 may correspond to any one of examples 500, 600, or 700.

As shown in FIG. 9, in some aspects, process 900 may include receiving system information for a first cell on a second cell, wherein the UE is camped on the second cell, and wherein the system information for the first cell is received with system information for the second cell (block 910). For example, the UE (e.g., using antenna 252, DEMOD 254, MIMO detector 256, receive processor 258, controller/processor 280, and/or the like) may receive system information for a first cell (e.g., a high cell) on a second cell (e.g., a low cell). The system information may include system information for the first cell and for the second cell. The system information for the first cell and the system information for the second cell may be received together (e.g., in a same broadcast, in concurrent broadcasts, in consecutive broadcasts, etc.).

As shown in FIG. 9, in some aspects, process 900 may include accessing an uplink of the first cell using the system information for the first cell (block 920). For example, the UE (e.g., using controller/processor 280, transmit processor 264, TX MIMO processor 266, MOD 254, antenna 252, and/or the like) may access an uplink of the first cell using the system information for the first cell (e.g., may perform a RACH procedure for the first cell). In some aspects, the UE may receive paging indicating that mobile-originated data is to be transmitted or may determine that mobile-originated data is to be transmitted. The UE may access the uplink of the first cell using the system information for the first cell. In some aspects, the UE may perform a RACH procedure for the first cell using at least one of the first cell or the second cell, as described in more detail elsewhere herein.

As shown in FIG. 9, in some aspects, process 900 may include establishing a connection on the first cell as a serving cell (block 930). For example, the UE (e.g., using controller/processor 280 and/or the like) may establish a connection on the first cell (e.g., and/or the second cell). The UE may establish the connection on the first cell as the serving cell (e.g., primary cell) of the UE. In this way, the UE may more quickly and efficiently access bandwidth of the high cell, thereby increasing bandwidth of the UE and reducing latency.

Process 900 may include additional aspects, such as any single aspect or any combination of aspects described below and/or in connection with one or more other processes described elsewhere herein.

In a first aspect, the first cell is associated with a higher frequency than the second cell. In a second aspect, alone or in combination with the first aspect, the first cell has a larger bandwidth than the second cell. In a third aspect, alone or in combination with the first aspect and/or the second aspect, the first cell and the second cell are duplex cells. In a fourth aspect, alone or in combination with any one or more of the first through third aspects, the first cell and the second cell are associated with a time division duplexing configuration or a frequency division duplexing configuration. In a fifth aspect, alone or in combination with any one or more of the first through fourth aspects, the system information includes a subset of all system information of the first cell, and wherein the subset is to be used to transition the UE to a connected mode. In a sixth aspect, alone or in combination with any one or more of the first through fifth aspects, the UE is configured to access the uplink of the first cell based at least in part on receiving paging on the second cell or to transmit mobile-originated data. In a seventh aspect, alone or in combination with any one or more of the first through sixth aspects, one or more downlink messages associated with a random access procedure are received on the second cell. In an eighth aspect, alone or in combination with any one or more of the first through seventh aspects, one or more uplink messages associated with a random access procedure are transmitted on the first cell based at least in part on a measurement of the second cell. In a ninth aspect, alone or in combination with any one or more of the first through eighth aspects, the UE may perform a periodic search or measurement of the first cell while the UE is in an idle mode or an inactive mode. In a tenth aspect, alone or in combination with any one or more of the first through ninth aspects, the UE may acquire a downlink of the first cell; and initiate a random access procedure on the first cell, wherein downlink and uplink messages associated with the random access procedure are transmitted and received on the first cell.

In an eleventh aspect, alone or in combination with any one or more of the first through tenth aspects, the first cell is used as the serving cell of the UE based at least in part on a received handover message. In a twelfth aspect, alone or in combination with any one or more of the first through eleventh aspects, the received handover message is a modified random access message. In a thirteenth aspect, alone or in combination with any one or more of the first through twelfth aspects, the UE may acquire the downlink of the first cell using a first receive chain, wherein a second receive chain is used for communication using the second cell. In a fourteenth aspect, alone or in combination with any one or more of the first through thirteenth aspects, the first cell and the second cell are configured as frequency division duplexed carriers with respective uplinks and respective downlinks. In a fifteenth aspect, alone or in combination with any one or more of the first through fourteenth aspects, the first cell is on a first band and the second cell is on a second band.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
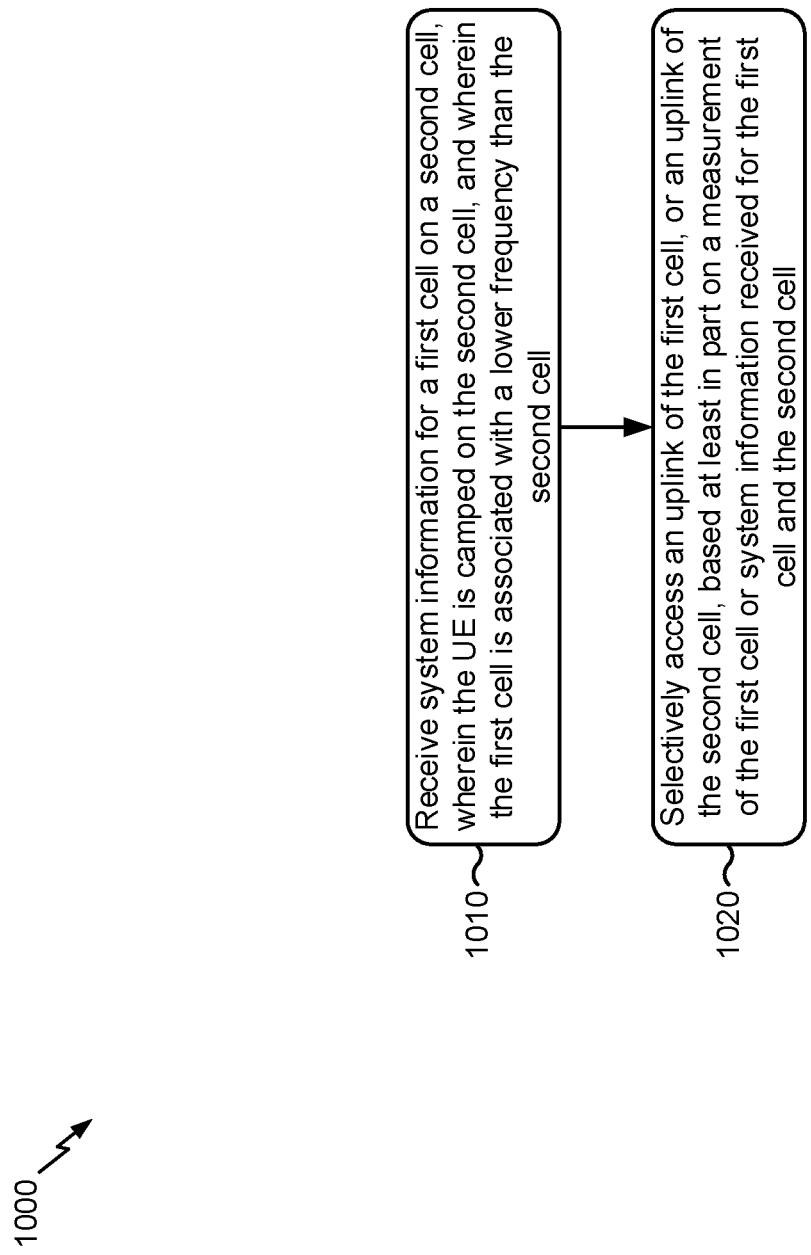
FIG. 10 is a diagram illustrating another example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs high cell access for 5G/NR. In some aspects, process 1000 may correspond to example 800.

As shown in FIG. 10, in some aspects, process 1000 may include receiving system information for a first cell on a second cell, wherein the UE is camped on the second cell, and wherein the first cell is associated with a lower frequency than the second cell (block 1010). For example, the UE (e.g., using antenna 252, DEMOD 254, MIMO detector 256, receive processor 258, controller/processor 280, and/or the like) may receive system information for a first cell (e.g., a low cell or a cell associated with a low band) on a second cell (e.g., a high cell or a cell associated with a high band). The UE may be camped on the second cell. The first cell may be associated with a lower frequency than the second cell. For example, the first cell may be associated with a different radio access technology than the second cell.

As shown in FIG. 10, in some aspects, process 1000 may include selectively accessing an uplink of the first cell, or an uplink of the second cell, based at least in part on a measurement of the first cell or system information received for the first cell and the second cell (block 1020). For example, the UE may determine whether an uplink of the first cell or an uplink of the second cell is to be accessed. In some aspects, the UE may determine whether a RACH procedure is to be performed using the first cell or the second cell. For example, the UE may determine whether one or more uplink RACH messages are to be transmitted by the UE on the low cell or the high cell. The UE may perform one or more of the above determinations based at least in part on a measurement regarding the high cell or based at least in part on system information received for the first cell and the second cell. The first cell may be established as a time division duplexing serving cell or a frequency division serving cell of the UE.

Process 1000 may include additional aspects, such as any single aspect or any combination of aspects described below and/or in connection with one or more other processes described elsewhere herein.

In a first aspect, the system information for the first cell is received with system information for the second cell. In a second aspect, alone or in combination with the first aspect, the second cell is a primary cell of the UE. In a third aspect, alone or in combination with the first aspect and/or the second aspect, the network may configure, and the UE may use, the first cell as a secondary cell of the UE based at least in part on a blind handover. In a fourth aspect, alone or in combination with any one or more of the first through third aspects, the first cell is on a first band and the second cell is on a second band.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving system information for a first cell on a second cell, wherein the UE is camped on the second cell, and wherein the system information for the first cell is received with system information for the second cell;
   performing a random access channel (RACH) procedure using the first cell and the second cell while the UE acquires a synchronization signal block for the first cell,
      wherein the performing the RACH procedure includes accessing, based at least in part on whether a channel measurement of the first cell or the second cell satisfies a threshold, an uplink of the first cell, using the system information for the first cell, to transmit at least one RACH message, associated with the RACH procedure, on the first cell, and a downlink of the second cell to receive at least another RACH message, associated with the RACH procedure, on the second cell; and
   establishing a connection on the first cell as a serving cell.

2. The method of claim 1, wherein the first cell is on a first band and the second cell is on a second band.

3. The method of claim 1, wherein the first cell is associated with a higher frequency than the second cell.

4. The method of claim 1, wherein the first cell has a larger bandwidth than the second cell.

5. The method of claim 4, wherein the first cell and the second cell are associated with a time division duplexing configuration or a frequency division duplexing configuration.

6. The method of claim 1, wherein the first cell and the second cell are duplex cells.

7. The method of claim 1, wherein the system information includes a subset of all system information of the first cell, and wherein the subset is to be used to transition the UE to a connected mode.

8. The method of claim 7, wherein at least one of:
   the at least one RACH message transmitted on the first cell comprises two RACH messages, or
   the at least another RACH message received on the second cell comprises two RACH messages.

9. The method of claim 7, wherein the at least one RACH message is transmitted on the first cell based at least in part on a measurement of the second cell.

10. The method of claim 1, wherein the UE is configured to access the uplink of the first cell based at least in part on receiving paging on the second cell or to transmit mobile-originated data.

11. The method of claim 1, further comprising:
    performing a periodic search or measurement of the first cell while the UE is in an idle mode or an inactive mode.

12. The method of claim 1, further comprising:
    acquiring a downlink of the first cell; and
    initiating the RACH procedure on the first cell,
       wherein performing the RACH procedure is based on the initiating the RACH procedure.

13. The method of claim 12, wherein the first cell is used as the serving cell of the UE based at least in part on a received handover message.

14. The method of claim 13, wherein the received handover message is a modified RACH message.

15. The method of claim 13, wherein acquiring the downlink of the first cell further comprises:
    acquiring the downlink of the first cell using a first receive chain, wherein a second receive chain is used for communication using the second cell.

16. The method of claim 12, wherein the RACH procedure is initiated after the downlink of the first cell is acquired.

17. A method of wireless communication performed by a user equipment (UE), comprising:
    receiving system information for a first cell on a second cell, wherein the UE is camped on the second cell, and wherein the first cell is associated with a lower frequency than the second cell;
    transmitting, based at least in part on a first channel measurement of the first cell satisfying a threshold, at least one random access channel procedure (RACH) message, associated with a RACH procedure, on the first cell; and receiving, based at least in part on a second channel measurement of the first cell not satisfying the threshold, at least another RACH message, associated with the RACH procedure, on the second cell, wherein the first cell is established as a time division duplexing serving cell or a frequency division duplexing serving cell of the UE.

18. The method of claim 17, wherein the system information for the first cell is received with system information for the second cell.

19. The method of claim 17, further comprising: configuring the first cell as a secondary cell of the UE based at least in part on a blind handover.

20. The method of claim 17, wherein the first cell and the second cell are configured as frequency division duplexed carriers with respective uplinks and respective downlinks.

21. A user equipment (UE) for wireless communication, comprising:
a memory; and
one or more processors coupled to the memory, the one or more processors configured to cause the UE to:
receive system information for a first cell on a second cell, wherein the UE is camped on the second cell, and wherein the system information for the first cell is received with system information for the second cell;
perform a random access channel (RACH) procedure using the first cell and the second cell while the UE acquires a synchronization signal block for the first cell,
wherein the one or more processors, to perform the RACH procedure, are configured to cause the UE to:
access, based at least in part on whether a channel measurement of the first cell or the second cell satisfies a threshold, an uplink of the first cell, using the system information for the first cell, to transmit at least one RACH message, associated with the RACH procedure, on the first cell, and a downlink of the second cell to receive at least another RACH message, associated with the RACH procedure, on the second cell; and
establish a connection on the first cell as a serving cell.

22. The UE of claim 21, wherein the UE is configured to access the uplink of the first cell based at least in part on receiving paging on the second cell, or to transmit mobile-originated data.

23. The UE of claim 22, wherein at least one of:
the at least one RACH message transmitted on the first cell comprises two RACH messages, or
the at least another RACH message received on the first cell comprises two RACH messages.

24. The UE of claim 22, wherein the at least one RACH message is transmitted on the first cell based at least in part on the channel measurement of the second cell.

25. The UE of claim 21, wherein the one or more processors are further configured to cause the UE to:
acquire a downlink of the first cell; and
initiate the RACH procedure on the first cell,
wherein the one or more processors, to perform the RACH procedure for the first cell or the second cell, is configured to cause the UE to:
perform based on initiating the RACH procedure on the first cell or the second cell is based at least in part on initiating the RACH procedure.

26. The UE of claim 25, wherein the first cell is used as the serving cell of the UE based at least in part on a received handover message.

27. The UE of claim 26, wherein the received handover message is a modified RACH message.

28. The UE of claim 26, wherein the one or more processors, to acquire the downlink of the first cell wherein the one or more processors, are further configured to cause the UE to:
acquire the downlink of the first cell using a first receive chain, wherein a second receive chain is used for communication using the second cell.

29. The UE of claim 25, wherein the RACH procedure is initiated after the downlink of the first cell is acquired.

30. A user equipment (UE) for wireless communication, comprising:
a memory; and
one or more processors coupled to the memory, the one or more processors configured to cause the UE to:
receive system information for a first cell on a second cell, wherein the UE is camped on the second cell, and wherein the first cell is associated with a lower frequency than the second cell;
transmit, based at least in part on a first channel measurement of the first cell satisfying a threshold, at least one random access channel procedure (RACH) message, associated with a RACH procedure, on the first cell; and
receive, based at least in part on a second channel measurement of the first cell not satisfying the threshold, at least another RACH message, associated with the RACH procedure, on the second cell, wherein the first cell is established as a time division duplexing serving cell or a frequency division duplexing serving cell of the UE.

* * * * *